United States Patent [19]
Della Bona et al.

[11] Patent Number: 5,764,218
[45] Date of Patent: Jun. 9, 1998

[54] METHOD AND APPARATUS FOR CONTACTING A TOUCH-SENSITIVE CURSOR-CONTROLLING INPUT DEVICE TO GENERATE BUTTON VALUES

[75] Inventors: Mark A. Della Bona, Los Altos; Jonathan Dorfman, Berkeley; Jay F. Hamlin, Santa Cruz, all of Calif.

[73] Assignee: Apple Computer, Inc., Cupertino, Calif.

[21] Appl. No.: 381,471

[22] Filed: Jan. 31, 1995

[51] Int. Cl.$^6$ ............................................. G06F 3/33
[52] U.S. Cl. ............................................. 345/157
[58] Field of Search ........................... 345/145, 173, 345/174, 166, 163, 158, 157

[56] References Cited

U.S. PATENT DOCUMENTS

| | | | |
|---|---|---|---|
| 5,305,017 | 4/1994 | Gerpheide | 345/174 |
| 5,327,161 | 7/1994 | Logan et al. | 345/157 |
| 5,404,458 | 4/1995 | Zetts | 345/173 |
| 5,432,531 | 7/1995 | Calder et al. | 345/145 |
| 5,559,943 | 9/1996 | Cyr et al. | 345/145 |

FOREIGN PATENT DOCUMENTS

| | | | |
|---|---|---|---|
| 0490001 | 12/1990 | European Pat. Off. | G06F 3/033 |
| 2544103 | 10/1984 | France | G06F 3/033 |

OTHER PUBLICATIONS

PCT Preliminary Examination Report for International Application No. PCT/US95/00116, mailed Aug. 1, 1997 (6 pages).
International Search Report, PCT/US96/00116, Jul. 6, 1996.
Hamman, et al., "Nod at Your Computer: Switchless Selection Techniques Using a Headphone Device", Proceedings of the Annual Conference of the Engineering in Medicine.
Macworld, Feb. 1996, "Touchpads", pp. 68–69.

*Primary Examiner*—Raymond J. Bayerl
*Assistant Examiner*—John F. Suraci
*Attorney, Agent, or Firm*—Blakely, Sokoloff, Taylor & Zafman

[57] ABSTRACT

A method and an apparatus for contacting a touch-sensitive cursor-controlling input device to generate button values simulating the button state of a mechanical button switch. This method and apparatus enable an operator to utilize the touch-sensitive cursor-controlling input device to change the value of a ButtonState variable (which simulates the ButtonState of a mechanical button switch) by (1) detecting contact intervals when the user contacts the touch-sensitive input device, (2) detecting gap intervals between subsequent contact intervals, and (3) moving the cursor on the display screen and changing the value of the ButtonState variable based on the duration of the contact and gap intervals. In turn, this button generation capability enables an operator to perform with a single touch-sensitive input device numerous control operations, such as cursor manipulation, click, multi-click, drag, click-and-drag, and multi-click-and-drag operations.

12 Claims, 14 Drawing Sheets

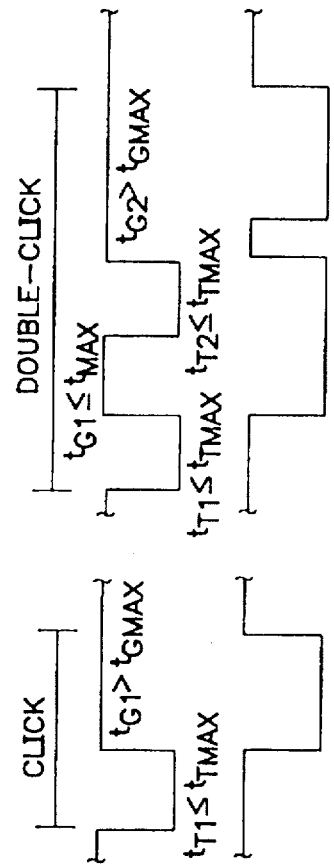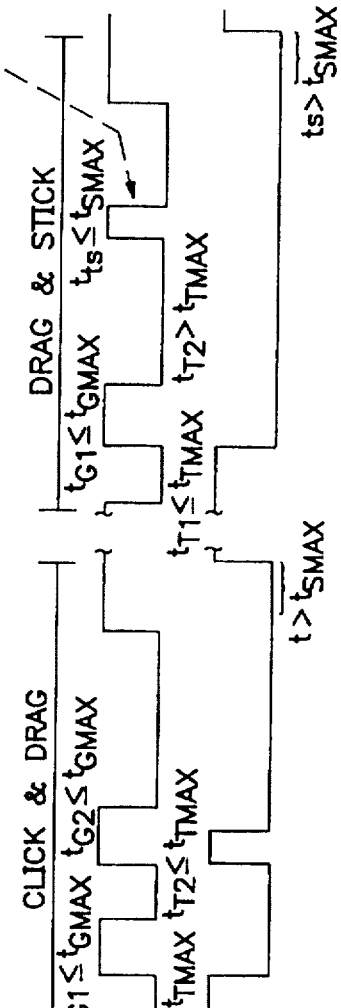
FIG. 5A  FIG. 5B  FIG. 5C  FIG. 5D  FIG. 5E  FIG. 5F

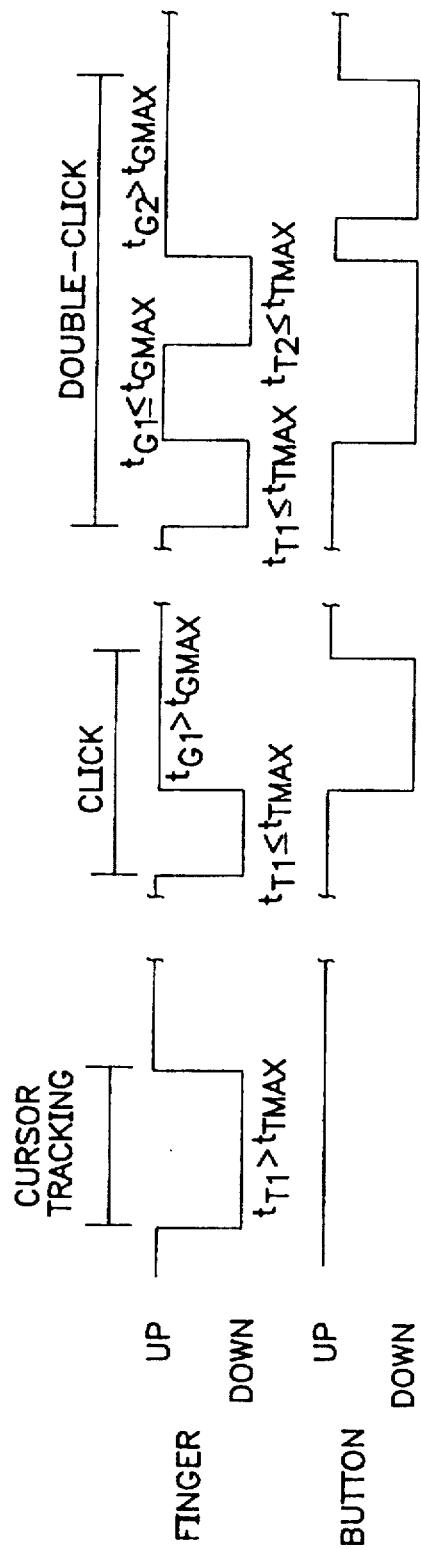

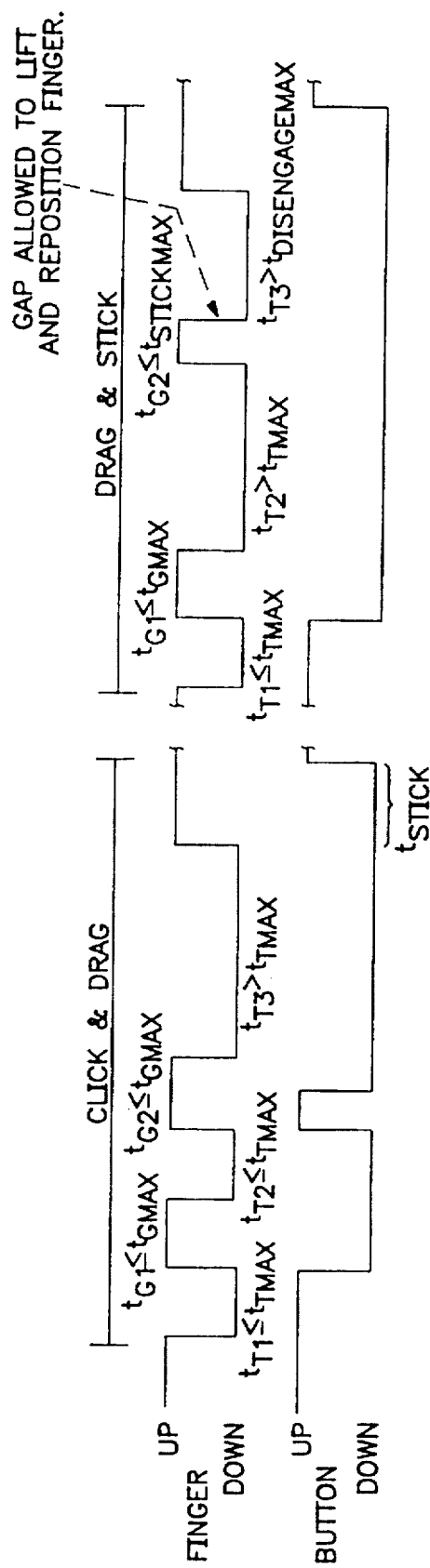
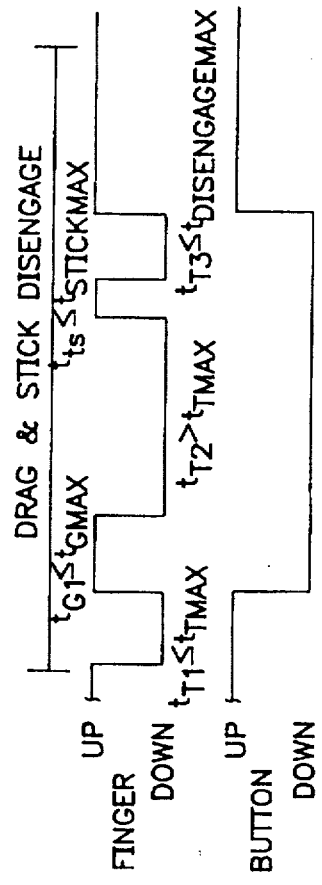
FIG. 7F
FIG. 7G
FIG. 7H

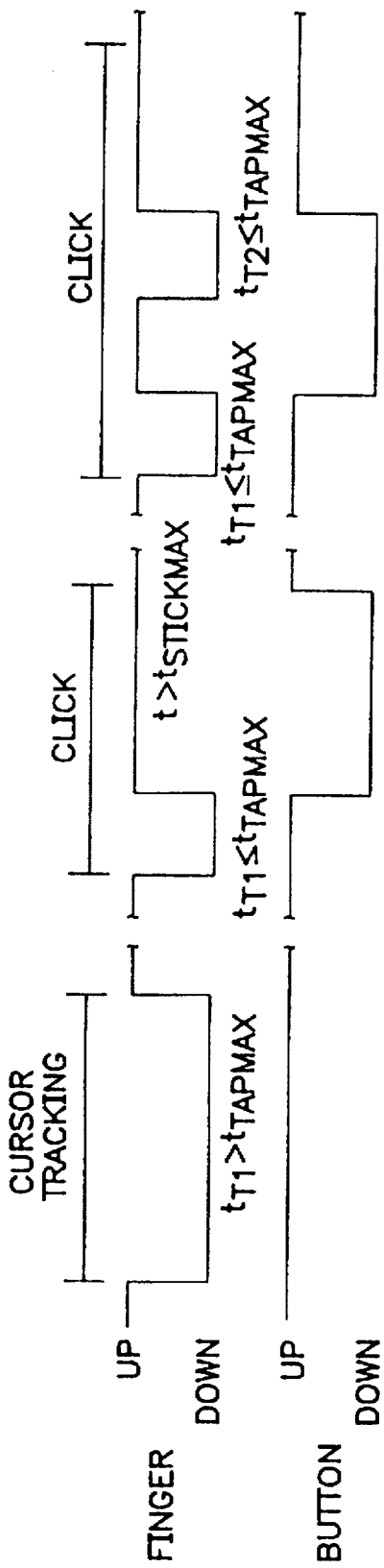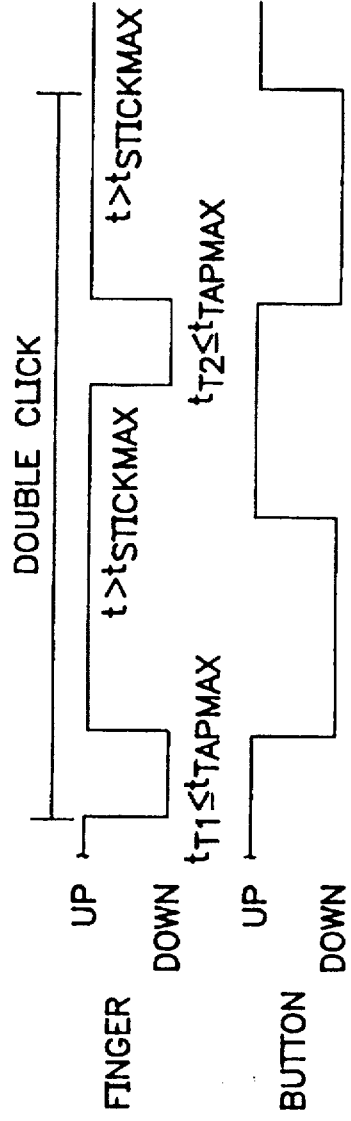
FIG. 11A  FIG. 11B  FIG. 11C  FIG. 11D

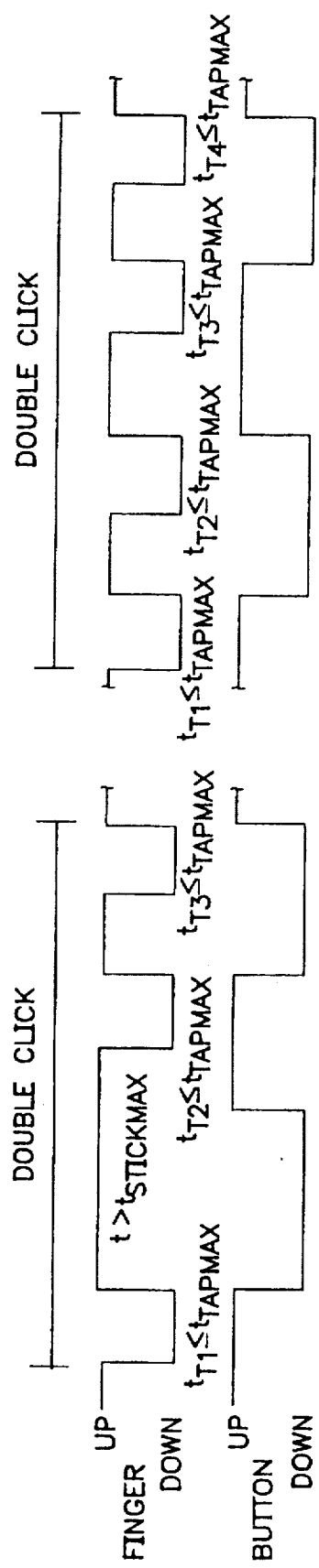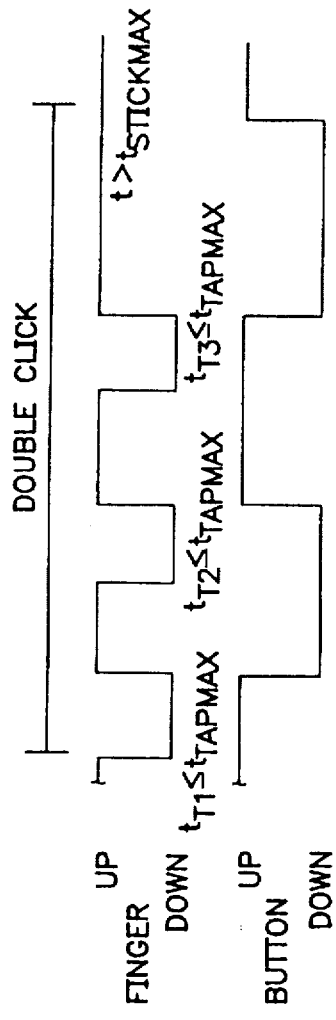
FIG. 11E
FIG. 11F
FIG. 11G

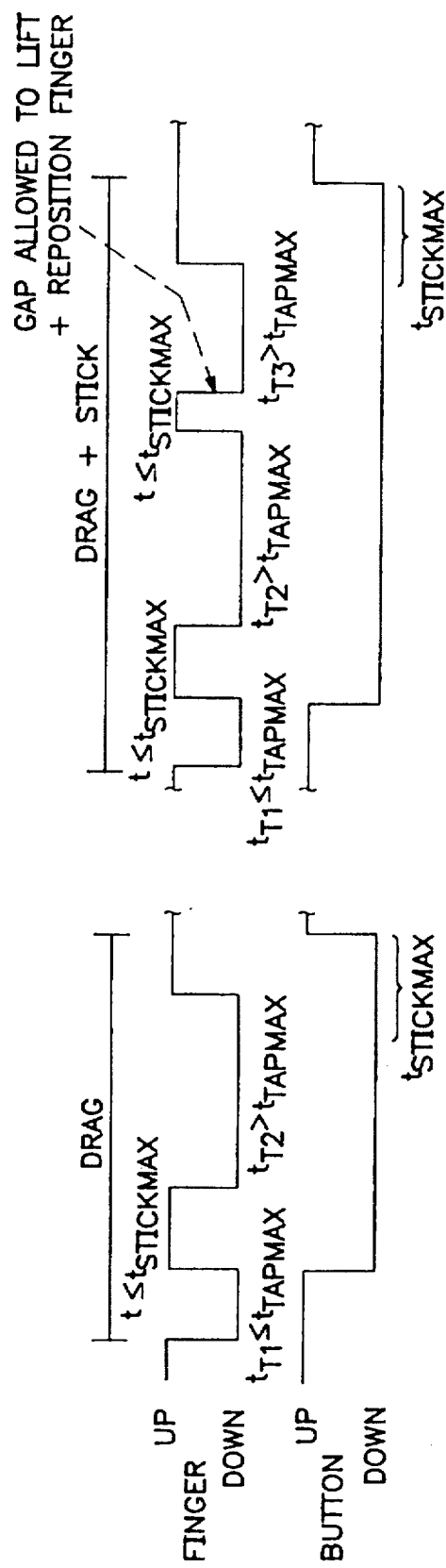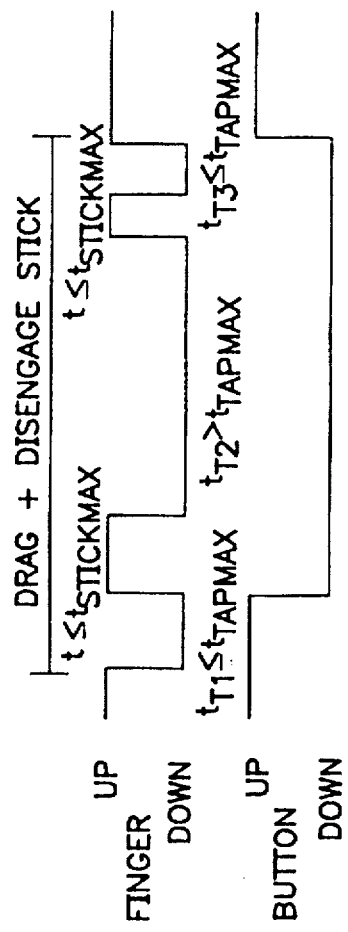
FIG. 11I
FIG. 11H
FIG. 11J

METHOD AND APPARATUS FOR CONTACTING A TOUCH-SENSITIVE CURSOR-CONTROLLING INPUT DEVICE TO GENERATE BUTTON VALUES

BACKGROUND OF THE INVENTION

1. Field of the Invention

The present invention pertains to the field of computer interfaces. More particularly, the present invention relates to a method and an apparatus for contacting a touch-sensitive cursor-controlling input device to generate button values simulating the button state of a mechanical button switch.

2. Background Art

With the virtual explosion in the number of computer systems, there has been a corresponding increase in demand for input devices that facilitate the human interaction with these computer systems. One type of prior art input devices simply consist of keyboards. These prior art input devices require the human operators to enter data by typing on alpha-numeric, special function, and arrow keys of the keyboards. The entered data are then usually displayed on computer screens.

Other more sophisticated and user-friendly prior art input interfaces use cursor controllers and mechanical button switches to perform control operations (such as cursor manipulation, clicking, double-clicking, dragging, clicking-and-dragging, etc.) in order to edit text, select objects displayed on the screen (e.g., icons, menus, scrollbars, text, etc.), or to initiate a given command (e.g., save or close a file, etc.). Under this prior art approach, the user manipulates the input device in order to control the movement of the cursor on a display screen and to generate button signals for performing the desired editing, selection, or command. For example, a user can select an icon displayed on the computer screen by placing a cursor over the icon and by clicking on the mechanical button switch (i.e., by depressing and then releasing this mechanical button switch).

There are several different types of cursor controlling input devices for controlling the movement of the cursor across a display screen. These input devices include a mouse, a trackball, a joystick, a writing pen, a stylus tablet, and a touchpad. Touchpads are one of the more promising cursor controlling interface devices currently in use. By sensing the inherent capacitance associated with a user's finger, a touchpad enables a user to control the tracking of the cursor (i.e., to move the cursor across the display screen) with his finger. In other words, a user can simply trace his finger across the touchpad in order to command the computer to move the cursor to any desired location on the screen. After the user positions the cursor over the target, the user can depress and release a mechanical button switch (i.e., can perform a click operation) in order to edit text, to select an object displayed on the screen (e.g., select an icon, an menu, a scrollbar, etc.), or to initiate a given command (such as save or close a file). In addition, after using the touchpad to move the cursor to the target, a user can display the contents of the targeted object by depressing and then releasing the mechanical button twice in rapid succession (i.e., by performing a double-click operation).

Furthermore, a user can perform drag operations, such as grouping of objects or text, by using the touchpad to "wipe" over the objects or text with the cursor while depressing the mechanical button switch. In addition, a user can perform additional drag operations such as "tearing off" menus, (1) by using the touchpad to position the cursor over a targeted object, and (2) by depressing the mechanical button and maintaining this button depressed while moving the targeted object to a new location by moving the cursor via the touchpad. A user can further drag a targeted object about the screen by performing a click-and-drag operation, which involves (1) using the touchpad to position the cursor over the targeted object, (2) selecting the targeted object by depressing and releasing the mechanical button (i.e., by performing a click operation), (3) depressing the mechanical button and maintaining this button depressed while moving the object to its new location by moving the cursor via the touchpad, and (4) releasing the object by releasing the mechanical button switch. Finally, through the touchpad and the mechanical button, a user can perform numerous other multi-click and multi-click-and-drag operations (e.g., triple-click, double click-and-drag, triple click-and-drag, etc.).

Consequently, in order to perform click, double-click, and drag operations, prior art touchpads not only require the use of a touchpad but also require the use of a mechanical button switch. Prior art mechanical button switches are mounted either separately as control buttons or integrated into the overall pad assemblies such that the depression of the pad surfaces actuates these switches. In either of these implementations, there is the added electromechanical complexity and cost. Moreover, mechanical switches integrated as part of the touchpad require fine adjustments to prevent inadvertent operation through normal use of the touchpad. Also, as these adjustments vary between users (e.g., different users prefer operation of the switches based on different finger pressures), the calibration of integrated mechanical button switches across a wide population becomes problematic.

Thus, there is a need in the field of computer interfaces for an apparatus and method of implementing the button generation function without using a mechanical button switch. Elimination of the mechanical button switch not only results in fewer parts and simplifies the assembly process, but it also enhances quality and reliability as well. Furthermore, such an apparatus and method would be ideally suited for portable computers as this method and apparatus reduces both size and weight.

SUMMARY OF THE INVENTION

The present invention provides a method and an apparatus for contacting a touch-sensitive cursor-controlling input device to generate button values simulating the button state of a mechanical button switch. The method and apparatus of the present invention enable an operator to utilize the touch-sensitive cursor-controlling input device to change the value of a ButtonState variable (which simulates the ButtonState of a mechanical button switch) by (1) detecting contact intervals when the user contacts the touch-sensitive input device, (2) detecting gap intervals between subsequent contact intervals, and (3) moving the cursor on the display screen and changing the value of the ButtonState variable based on the duration of the contact and gap intervals. In turn, this button generation capability enables an operator to perform with a single touch-sensitive input device numerous control operations, such as cursor manipulation, click, multi-click, drag, click-and-drag, and multi-click-and-drag operations.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 5 presents timing diagrams which describe the operation of the embodiment of the present invention set forth in FIG. 4.

FIG. 7 presents timing diagrams which describe the operation of the embodiment of the present invention set forth in FIG. 6.

FIG. 11A–11J present timing diagrams describing the operation of the embodiment of the present invention set forth in FIGS. 8 and 9.

DETAILED DESCRIPTION

The present invention is a method and an apparatus for contacting a touch-sensitive cursor-controlling input device to generate button values corresponding to the button state (i.e., the up and down states) of a mechanical button switch. In the following description, for purposes of explanation, numerous specific details are set forth in order to provide a thorough understanding of the present invention. However, it will be understood by one of ordinary skill in the art that the present invention may be practiced without these specific details. In other instances, well-known structures and devices are shown in block diagram form in order not to obscure the description of the present invention with unnecessary detail.

Figure 1:
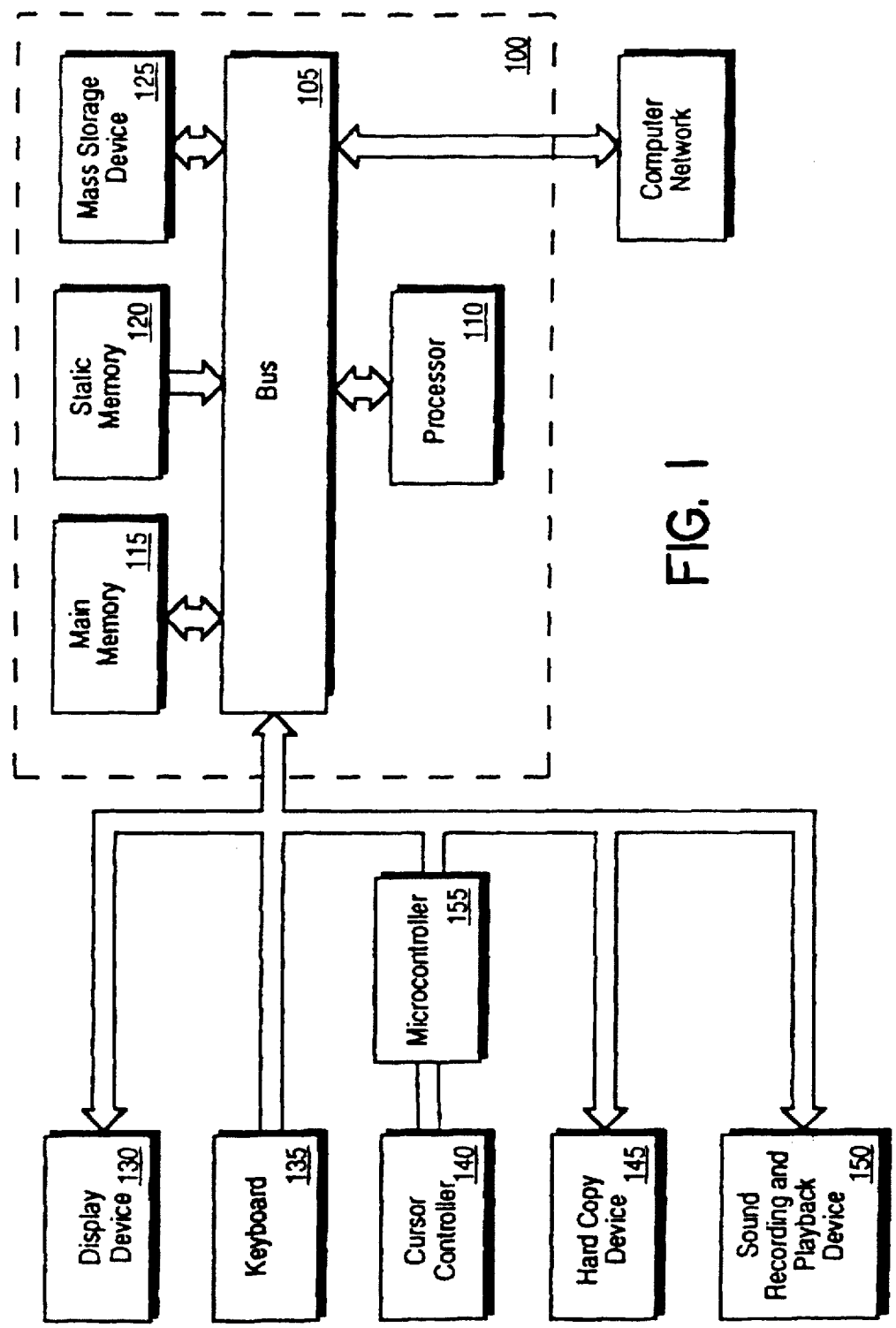
FIG. 1 presents a computer system upon which one embodiment of the present invention is implemented.

FIG. 1 presents a computer system upon which one embodiment of the present invention is implemented. Computer system 100 includes a bus or other communication means 105 for communicating information. A microprocessor 110 couples with bus 105 for processing digital data. Computer system 100 further includes a random access memory (RAM) or some other dynamic storage device 115 (referred to in FIG. 1 as main memory), which also couples to bus 105. Main memory 115 stores digital data and program instructions for execution by processor 110. Main memory 115 also may be used for storing temporary variables or other intermediate information during execution by processor 110. Computer system 100 also includes a read only memory (ROM) and/or other static storage device 120 coupled to bus 105 for storing static information and instructions for processor 110. In addition, mass data storage device 125 such as a magnetic disk or an optical disk and its corresponding disk drive may also be included.

Computer system 100 may further include a display device 130, such as a cathode ray tube (CRT) or a liquid crystal display (LCD) coupled to bus 105 for displaying information to a computer user. Alphanumeric input device 135 (e.g., a keyboard) may also be coupled to bus 105 for communicating information and command selections to processor 110. An additional user input device which may be coupled to bus 105 is cursor controller 140. Input device 140 may take many different forms, such as a mouse, a trackball, a stylus tablet, a touch-sensitive input device (e.g., a touchpad), etc. Microcontroller 155 provides an interface between cursor controller 140 and bus 105. Another device which may be coupled to bus 105 is hard copy device 145 which may be used for printing a hard copy on paper. It should be noted that any or all of the components of computer system 100 and associated hardware may be used in conjunction with the present invention. However, it is appreciated that any type of configuration of the system may be used for various purposes as the user requires.

As mentioned before, one embodiment of cursor controller 140 of FIG. 1 is a touch-sensitive input device. This touch-sensitive input device may be a separate pad which could be held in the hand, placed on a desktop, or built into the computer keyboard. An operator utilizes this touch-sensitive input device by contacting (e.g., touching the device with his finger), which in turn causes a cursor to move across the display device based on the information pertaining to the operator's contact (e.g., the displacement of the operator's finger on this device) that this device provides to the computer. In addition, as mentioned below, the method and apparatus of the present invention enable an operator to generate button values by contacting this touch-sensitive input device. More specifically, an operator can utilize this touch-sensitive input device to change the value of a ButtonState variable (which simulates the button state of a mechanical button switch) based on the temporal duration of the user's contacts with this touch-sensitive input device (i.e., based on the duration of the contact intervals) and the lapse of time between subsequent contact intervals (i.e., based on the duration of the gap intervals between the contact intervals).

Figure 2:
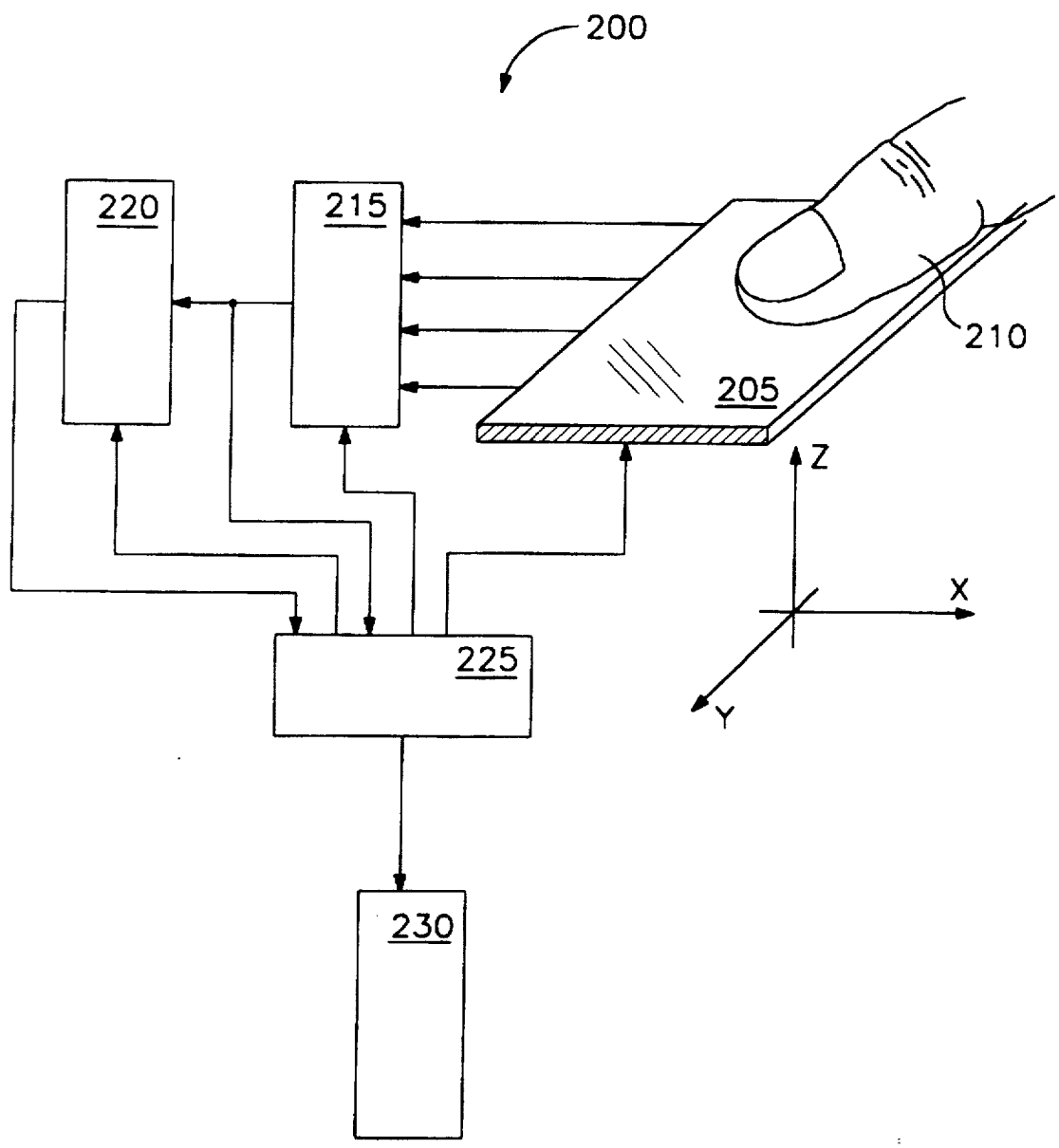
FIG. 2 shows an example of a touch-sensitive cursor-controlling input device that may be utilized to implement the present invention.

FIG. 2 presents one embodiment of the touch-sensitive input device that may be utilized to implement the present invention. For one embodiment of the present invention, touch-sensitive cursor-controlling input device 200 of FIG. 2 is a touchpad. Touchpad 200 includes virtual electrode pad 205, electrical balance measurement circuit 215, balance ratio determination circuit 220, and microcontroller 225. For one embodiment of the present invention, virtual electrode pad 205 is in the shape of a rectangular sheet. It is capable of forming "virtual electrodes" at various positions on its top and bottom surfaces. These electrodes are denoted as "virtual electrodes" since separate conductive strips on the two sides of pad 205 are used to form single elements denoted as "virtual electrodes." The virtual electrodes are connected to electronic circuitry capable of measuring the electrical balance between selected top and bottom virtual electrodes.

Balance ratio determination circuit 220 determines the ratio of one balance measurement to another. Microcontroller 225 selects appropriate electrodes for balance measurement and ratio determination. Microcontroller 225 also responds to balance ratios to calculate position information of the sensed object (e.g., finger 210). This information may include positional data along one axis or two axes parallel to the electrode pad surface (e.g., along the x and y axes). Additional "proximity" information along an axis perpendicular to the surface of electrode pad 205 (e.g., along the z-axis) may also be determined from an appropriate balance measurement. Position information determined by microcontroller 225 is provided to a utilization means 230, which may be any of a variety of electronic or computer devices (such as computer system 100).

Consequently, touchpad 200 generates x, y, and z data pertaining to the user's contact with the touchpad (e.g., pertaining to the position of the operator's finger on the touchpad) over some region in the x, y and z directions. Velocities, accelerations, timing differentials, and signal strengths can be determined from this data string. As mentioned below, when these parameters are considered along with prior events, it is possible to discern between cursor manipulation, click, multi-click, drag, click-and-drag, and multi-click-and-drag operations. Additionally, raw x, y, and z data can be filtered to optimize the operation of the touch-sensitive input device as perceived by the user.

Since feedback to the user that an operation has been initiated or completed is important, feedback to the user can be incorporated into the present invention through the use of audio signals (e.g., various beeps, clicks, or customizable sounds issued through the computer's sound system) or video signals (e.g., a change in shape, color, or highlighting of the cursor, on-screen status indicator, etc.).

Figure 3:
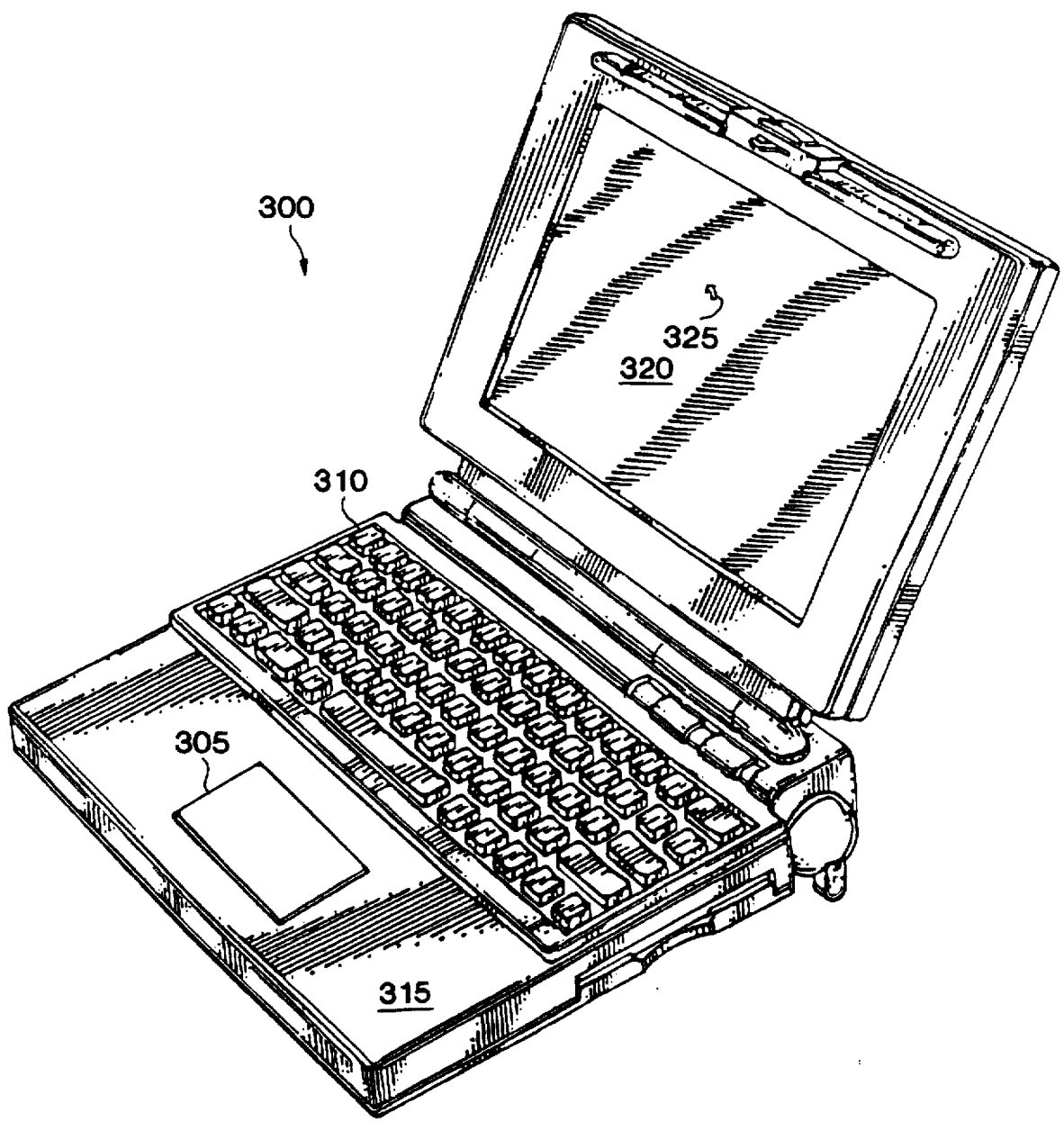
FIG. 3 shows a perspective view of a computer system utilizing the touch-sensitive input device of FIG. 2.

FIG. 3 shows a perspective view of a computer system 300 having touchpad 200 of FIG. 2. Personal computer 300 includes a keyboard 310, palm rests 315, display screen 320, and touchpad 305. Touchpad 305 enables a user to control the movements of cursor 325 on screen 320 by contacting the touchpad (e.g., by moving his finger across the touchpad). In addition, based on the duration of an operator's contacts with this touch-sensitive input device and the duration of gap intervals between subsequent contact intervals, touchpad 305 enables a user to generate button values which simulate the button state (i.e., the up or down position) of a mechanical button switch. Although computer 300 can be any of a variety of computers, for one embodiment of the present invention it is a laptop computer which is a single integrated unit (i.e., has all of its elements placed within one case) and which is small enough to fit onto a user's lap.

Inside computer system 300 reside all the essential and well known electronic circuitry (such as the components shown in FIG. 1) for the computer's operation.

Figure 4:
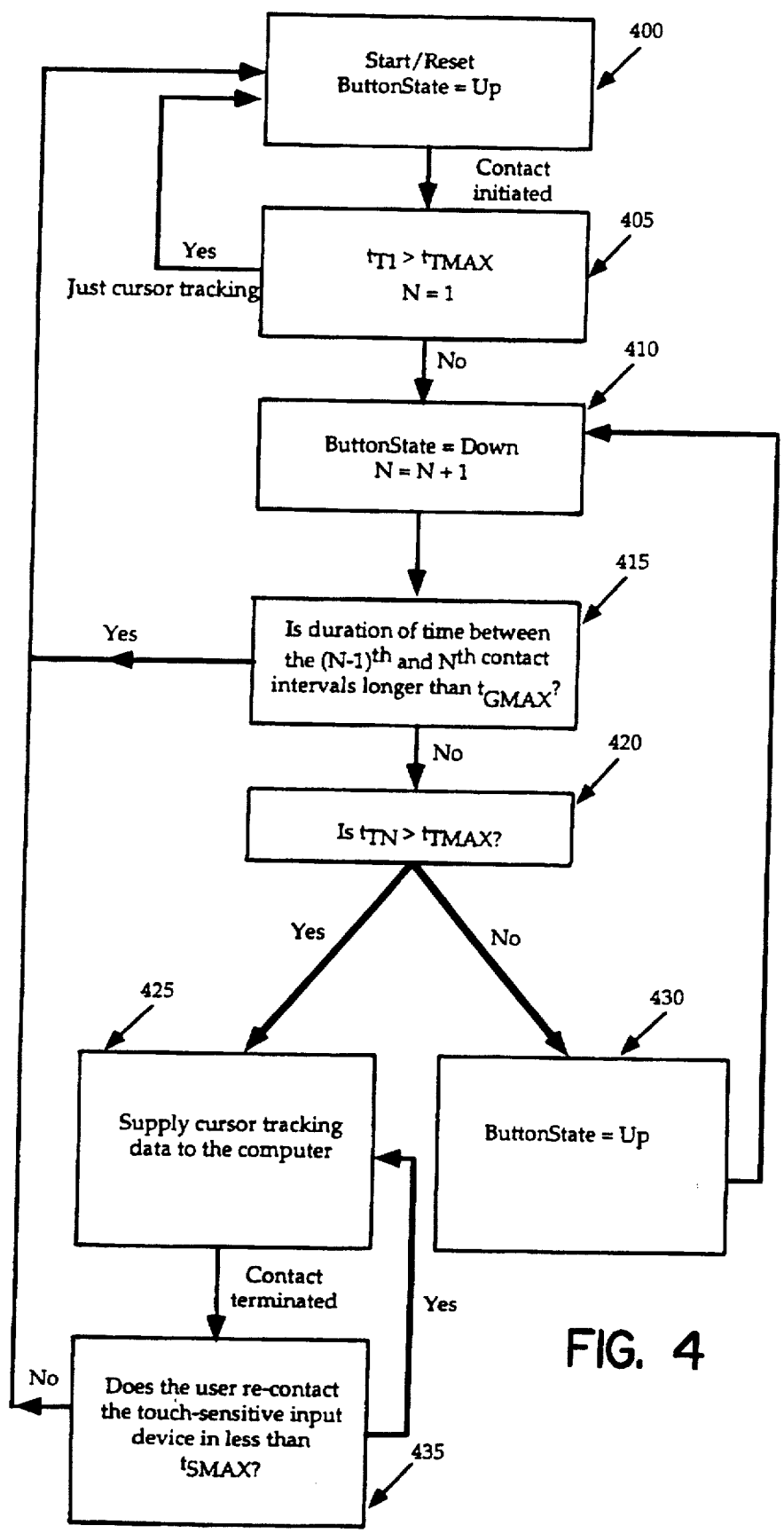
FIG. 4 presents one embodiment of the present invention for generating button values with a touch-sensitive cursor-controlling input device, such as the touch-sensitive input device of FIG. 2.

FIG. 4 presents one embodiment of the present invention for generating button values by contacting a touch-sensitive cursor-controlling input device such as the touch-sensitive input device of FIG. 2. This embodiment of the present invention can be implemented by button generation circuitry in the touch-sensitive input device or in the computer system. Alternatively, this embodiment of the present invention can be implemented as a software code (i.e., a code residing in the RAM) or a firmware code (i.e., a code residing in the ROM) in either the computer system or the touch-sensitive input device.

The operation of this embodiment of the present invention will now be described by reference to FIG. 4 and FIG. 5 (which presents one embodiment of the timing diagrams for the operation of this embodiment of the present invention). The initial step in the flowchart of FIG. 4 is the start/reset step 400. During this step, a ButtonState variable, simulating the button state of a mechanical button switch, is set to equal an Up value (i.e., a first predetermined button value). If the user contacts the touch-sensitive input device for a first time (e.g., if the user touches the input device with his finger for a first time), the process then transitions to step 405. At step 405 a determination is made whether the first contact interval ($t_{T1}$) lasts longer than a user selectable predetermined maximum tap interval ($t_{MAX}$). Also, at step 405 an integer variable N, representing the number of contact intervals for performing a particular control operation (such as a cursor manipulation, click, multi-click, drag, click-and-drag, and multi-click-and-drag operations), is set equal to one.

As shown in Part A of FIG. 5, if the first contact interval lasts longer than the maximum tap interval (i.e., if $t_{T1}>t_{MAX}$), the operation of the touch-sensitive cursor-controlling input device during the first contact interval is identified as a cursor control operation (i.e., a cursor tracking operation). Thus, positional data relating to the user's contact with the touch-sensitive input device is supplied to the computer system in order to effectuate cursor movement on the computer screen. In addition, once this initial cursor tracking operation is terminated (e.g., once the user removes his finger from the touchpad) the process resets to step 400. Alternatively, if at step 405 a determination is made that the first contact interval does not last longer than the maximum tap interval (i.e., if $t_{T1} \leq t_{MAX}$), the process transitions to step 410, during which (as shown in Parts B–F of FIG. 5) the ButtonState variable is set equal to a Down value (i.e., a second pre-determined level) and number of contacts variable N is incremented by one.

From step 410 the process transitions to step 415, where a determination is made whether the user initiates an $N^{th}$ contact after the (N-1)th contact in less than a predetermined maximum gap time (i.e., $t_{GMAX}$). In other words, at step 415, a determination is made whether the time interval between the (N-1)th contact interval and the $N^{th}$ contact interval is longer than a predetermined maximum gap interval ($t_{GMAX}$). As shown in Part B of FIG. 5, if the gap interval is longer than the predetermined maximum gap interval (i.e. if $t_G>t_{GMAX}$), the process identifies the user's contact with the touch-sensitive input device as a click operation, and therefore transitions back to reset step 400 to set the value of the ButtonState variable equal to the Up value.

On the other hand, if the gap time between the (N-1)$^{th}$ contact interval and the $N^{th}$ contact interval is not longer than the maximum gap time (i.e. if $t_G \leq t_{GMAX}$), the process transitions from step 415 to step 420. During step 420, a determination is made if the $N^{th}$ contact interval lasts longer than the predetermined maximum tap interval (i.e., if $t_{TN}>t_{MAX}$). As shown in Part D of FIG. 5, if the $N^{th}$ contact interval does last longer than the maximum tap interval, the process identifies the user's contacts with the touch-sensitive input device as a drag operation and thus transitions to step 425. At step 425, the process supplies to the computer the positional data corresponding to the user's contact with the touch-sensitive input device (i.e., supplies cursor tracking data to the computer system), which along with the button down value for the ButtonState variable enables the computer to perform the requested drag operation.

Once the user terminates his $N^{th}$ contact with the touch-sensitive input device (e.g., once the user removes his finger from the touch-sensitive input device for the $N^{th}$ time), the process transitions to step 435. During this step, a determination is made whether after the $N^{th}$ contact interval, the operator recontacts the touch-sensitive input device in less than a predetermined maximum sticky drag time (i.e., $t_S \leq t_{SMAX}$). If so, the process transitions back to step 425 and resumes its drag operation by resuming to supply to the computer cursor tracking data while ButtonState is set to the Down value. In other words, as shown in Part F of FIG. 5, step 435 enables a user to continue a drag operation even after momentarily terminating a contact with the touch-sensitive input device. This sticky drag feature of the present invention allows a user to quickly reposition his contact (e.g., his finger) without dropping a selected item. This feature is advantageous when, for example, the user's finger reaches the edge of the pad and has to be repositioned in order to continue dragging an item. In one embodiment of the present invention, at step 435, before the sticky drag determination is made an initial determination is made whether the user was contacting the pad at its edge prior to the termination of the contact. This determination in turn allows the sticky drag feature to only be activated for situations where the user reaches the edge of the pad.

Alternatively, as shown in Parts C and E of FIG. 5, if at step 420 a determination is made that the $N^{th}$ contact interval is an $N^{th}$ tap interval whose duration is not longer than the maximum tap time ($t_{MAX}$), the process identifies user's contacts with the touch-sensitive input device as a possible multi-click, click-and-drag or multi-click-and-drag operation, and thus sets the value of the ButtonState variable equal to the Up value by transitioning to step 430. From step 430, the process transitions back to step 410, during which the ButtonState variable is again set equal to the Down value (as shown in Parts C and E of FIG. 5) and N is incremented by one.

Then at step 415, if the gap time ($t_{GN}$) between the $N^{th}$ contact interval and the (N-1)th contact interval is greater than the maximum gap time ($t_{GMAX}$), the process identifies the user's contacts with the touch-sensitive input device as a multi-click operation and thus transitions back to reset step 400 where the ButtonState variable is set equal to the Up value (as shown for a double-click operation in Part C of FIG. 5). Alternatively, if the gap time between the $N^{th}$ contact interval and the (N-1)th contact interval is less than or equal to the maximum gap time (i.e., if $t_{GN} \leq t_{GMAX}$), steps 420-435 are then performed in order to perform multi-click, click-and-drag, and multi-click-and-drag operations. For example, the user can perform a click-and-drag (as shown in Part E of FIG. 5) or multi-click-and-drag operation by causing the process of FIG. 4 to transition from step 415 to steps 420, 425, and 435.

Figure 6:
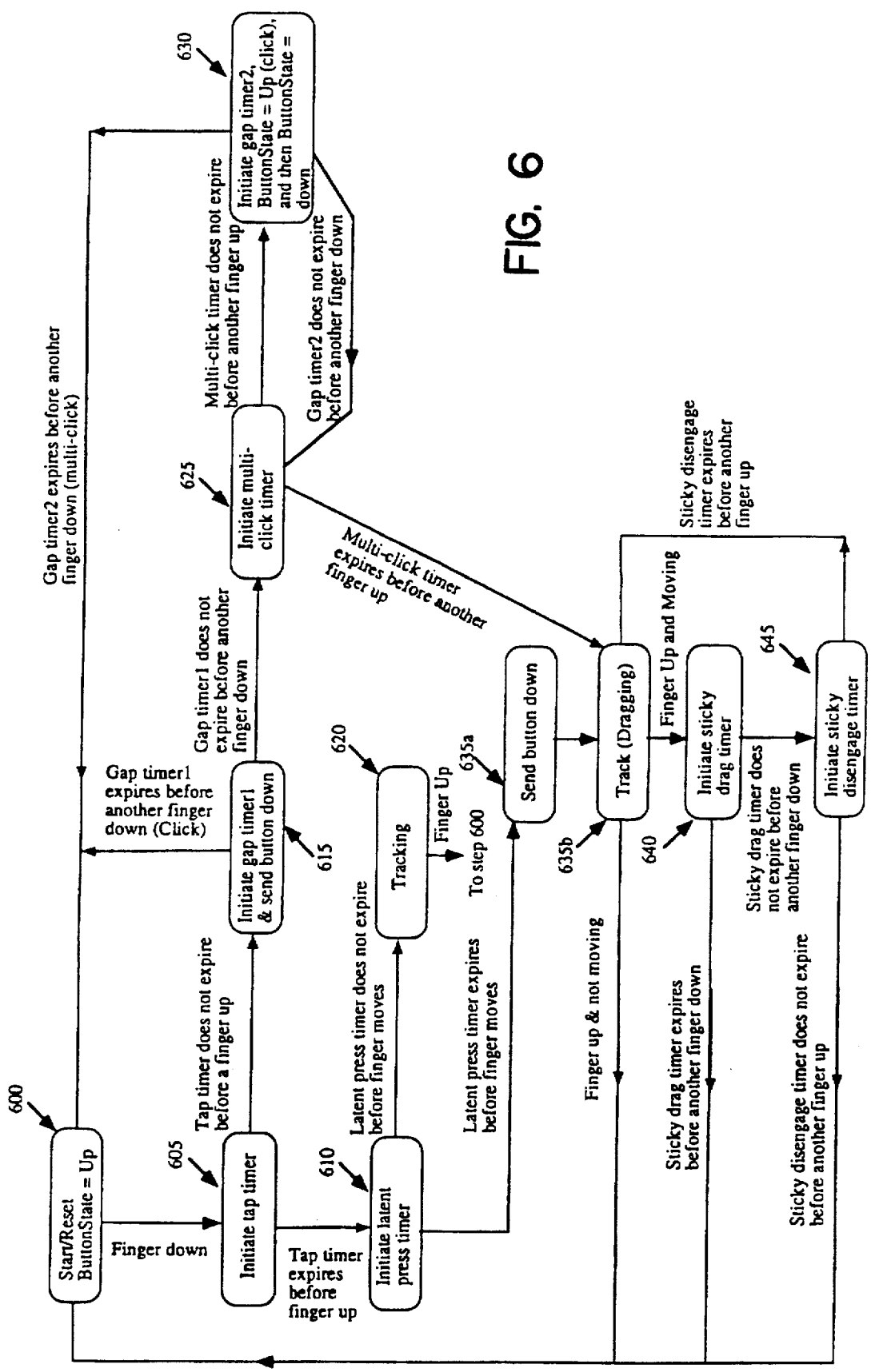
FIG. 6 presents an alternative embodiment of the present invention for generating button values with a touch-sensitive cursor-controlling input device, such as the touch-sensitive input device of FIG. 2.

FIG. 6 presents an alternative embodiment of the present invention for generating button values by contacting a touch-sensitive cursor-controlling input device, such as the touch-sensitive input device of FIG. 2. This embodiment of the present invention can be implemented by button generation circuitry in the touch-sensitive input device or in the computer system. Alternatively, this embodiment of the present invention can be implemented as a software code or a firmware code in either the computer system or the touch-sensitive input device. Furthermore, this embodiment of the present invention generates button values based on the temporal duration of the user's contacts with the touch-sensitive input device (i.e., based on the duration of the contact intervals) and the lapse of time between subsequent contact intervals (i.e., based on the duration of the gap intervals between subsequent contact intervals). More specifically, this embodiment of the present invention operates by (1) initiating timers at the initiation or termination of a contact interval, and (2) then determining whether the user terminates his contact or initiates another contact prior to the expiration of these timers. These timers can be either count up or count down timers, which respectively expire when they reach a predetermined expiration value by counting up or by counting down. In addition, for the embodiment of the present invention shown in FIG. 6, the value of each of the timers can be adjusted by the user.

The operation of this embodiment of the present invention will now be described by reference to FIG. 6 and FIG. 7 (which presents one embodiment of the timing diagrams for this embodiment of the present invention). In the following description, contact intervals are initiated by the user placing his finger down on the touch-sensitive input device (i.e., by a finger down operation) and contacts are terminated by the user removing his finger from the input device (e.g., by the user performing a finger up operation). However, it is to be understood that the user can employ alternative means (such as a mechanical object) for initiating and terminating his contacts with the touch-sensitive input device.

As shown in FIG. 6, this embodiment of the present invention initiates at start/reset step 600. At this step, the value of a ButtonState variable, simulating the button state of a mechanical button switch, is set to equal an Up value (e.g., a first predetermined value). Once the user places his finger on the touch-sensitive input device (i.e., once the user performs a finger down operation for a first time), the process transitions to step 605 in order to initiate a tap timer (i.e., in order to cause a tap timer to start counting). If the tap timer expires prior to user removing his finger, a latent press timer is initiated at step 610. As shown in Part E of FIG. 7, if the user does not move his finger on the touch-sensitive input device for the duration of the latent press timer, the process (1) transitions to step 635a where the ButtonState variable is set equal to a Down value (e.g., a second predetermined button value), and (2) then transitions to step 635b where cursor tracking data is supplied to the computer in order to cause a drag operation to be performed. However, if the user moves his finger prior to the expiration of the latent pressed timer, the process identifies the user's contact as a cursor tracking operation (as shown in Part A of FIG. 7) and thus transitions to step 620. At step 620, the process performs the cursor tracking operation by supplying positional data relating to the user's contact (e.g., data pertaining to the user's finger position) to the computer system. Once the cursor tracking operation is terminated, the process then returns to start/reset step 600.

Alternatively, as shown in Parts B–D and F–H of FIG. 7, if at step 605 the tap timer does not expire prior to the removal of the first finger down, the ButtonState variable is set equal to the Down value (i.e., a second predetermined value) and a first gap timer is initiated at step 615. If the gap timer expires prior to the user placing his finger down again (i.e., prior to a second finger down), the process identifies that the first finger down (which caused the transition from step 600 to step 605) and the first finger up (which caused the transition from step 605 to step 615) as a single click operation. Thus, as shown in Part B of FIG. 7, the process transitions back to step 600, where the ButtonState variable is set equal to an Up value.

On the other hand, if the first gap timer does not expire before the user puts his finger back down on the touch-sensitive input device (i.e., if the gap timer does not expire before a second finger down operation), a multi-click timer is initiated at step 625. If the multi-click timer does not expire before the user removes his finger (i.e., before another finger up operation), the process transitions to step 630 where a second gap timer is initiated. In addition, as shown in Parts C and F of FIG. 7, the process at step 630 momentarily set the value of the ButtonState variable equal to the Up value (which thereby produces a click operation) and then sets the value of the ButtonState variable equal to the Down value. Furthermore, if the second gap timer expires before the user recontacts the touchpad, the process recognizes the past finger up and finger down operations as performing a multi-lick operation and thus transitions back to reset step 600 to set the value of the ButtonState variable to the Up value (as shown for a double-click operation in Part C of FIG. 7). However, if the second gap timer does not expire before another finger down operation is performed, the process transitions back 625 in order to allow the user to perform multi-click and multi-click-and-drag operations.

Alternatively, if at step 625 the multi-click timer expires prior to the user removing his finger (i.e., prior to another finger up), the process transitions to step 635b. At this step, in order to allow the user to perform drag, click-and-drag, and multi-click-and-drag operations, cursor manipulation data is supplied to the computer (as shown in Parts D–H of FIG. 7). Once the user removes his finger, the process then transitions from step 635b back to start/reset step 600 if the drag operation did not involve movement of an object. Drag operations do not involve movement of objects in several instances, such as when drag operations are performed to "wipe" over text, to scroll data, and to select objects from menus.

However, if the drag operation involved movement of an object, the process transitions from step 635b to step 640 once the user removes his finger. At step 640, a sticky drag timer is initiated. As shown in Parts D–F of FIG. 7, if prior to the expiration of this sticky drag timer the user does not recontact the touch-sensitive input device, the process sets the value of the ButtonState variable equal to the Up value by transitioning back to start/reset step 600. However, if the user recontacts the touch-sensitive input device prior to the expiration of the sticky drag timer, a disengage sticky drag timer is initiated at step 645. As shown in Part H of FIG. 7, if the user removes his finger before the disengage sticky drag timer expires, the process transitions back to start/reset step 600. Therefore, the disengage sticky drag timer provides an operator with the ability to circumvent the sticky drag feature of this embodiment of the present invention. Alternatively, as shown in Part G of FIG. 7, if the user does not remove his finger prior to the expiration of the sticky drag disengage timer, the process transitions back to step 635b in order to allow the user to continue his drag, click-and-drag, or multi-click-and-drag operation.

Figure 8:
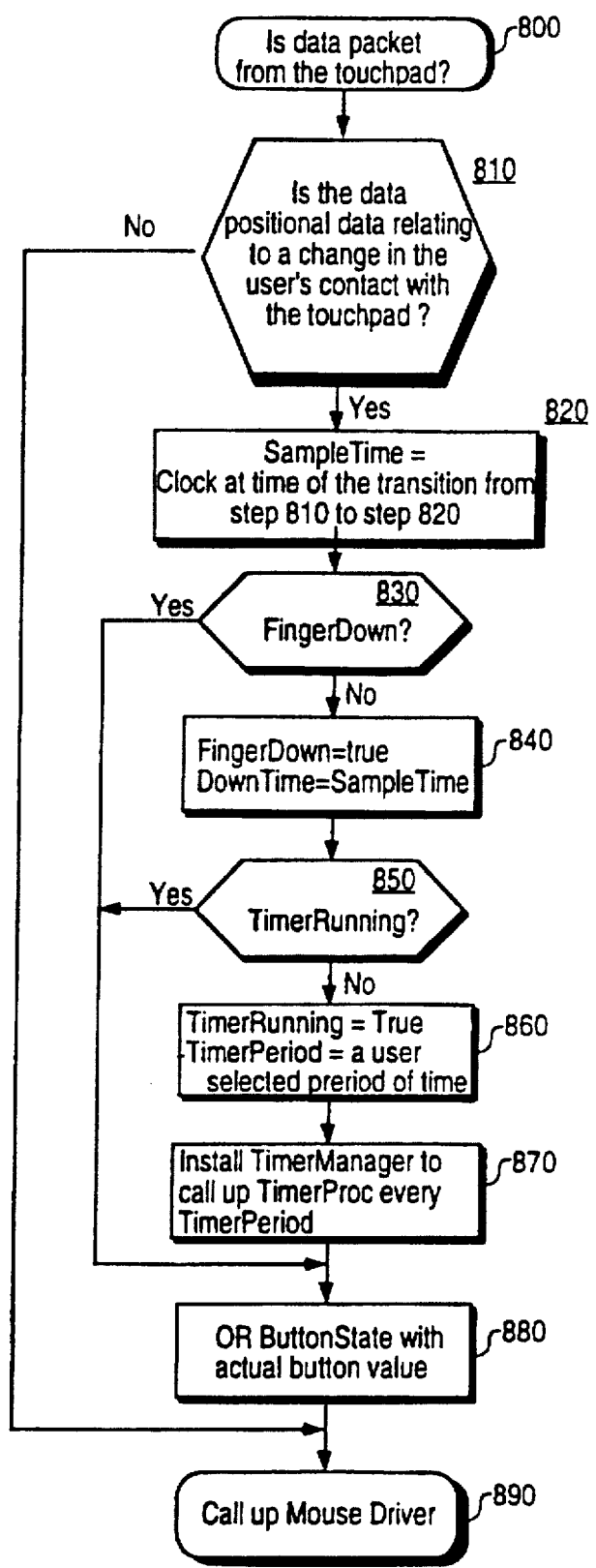
FIGS. 8 and 9 present yet another embodiment of the present invention for generating button values with a touch-sensitive cursor-controlling input device, such as the touch-sensitive input device of FIG. 2, wherein the steps of this embodiment of the present invention are implemented by a touch-sensitive input driver stored in the computer system.
Figure 9:
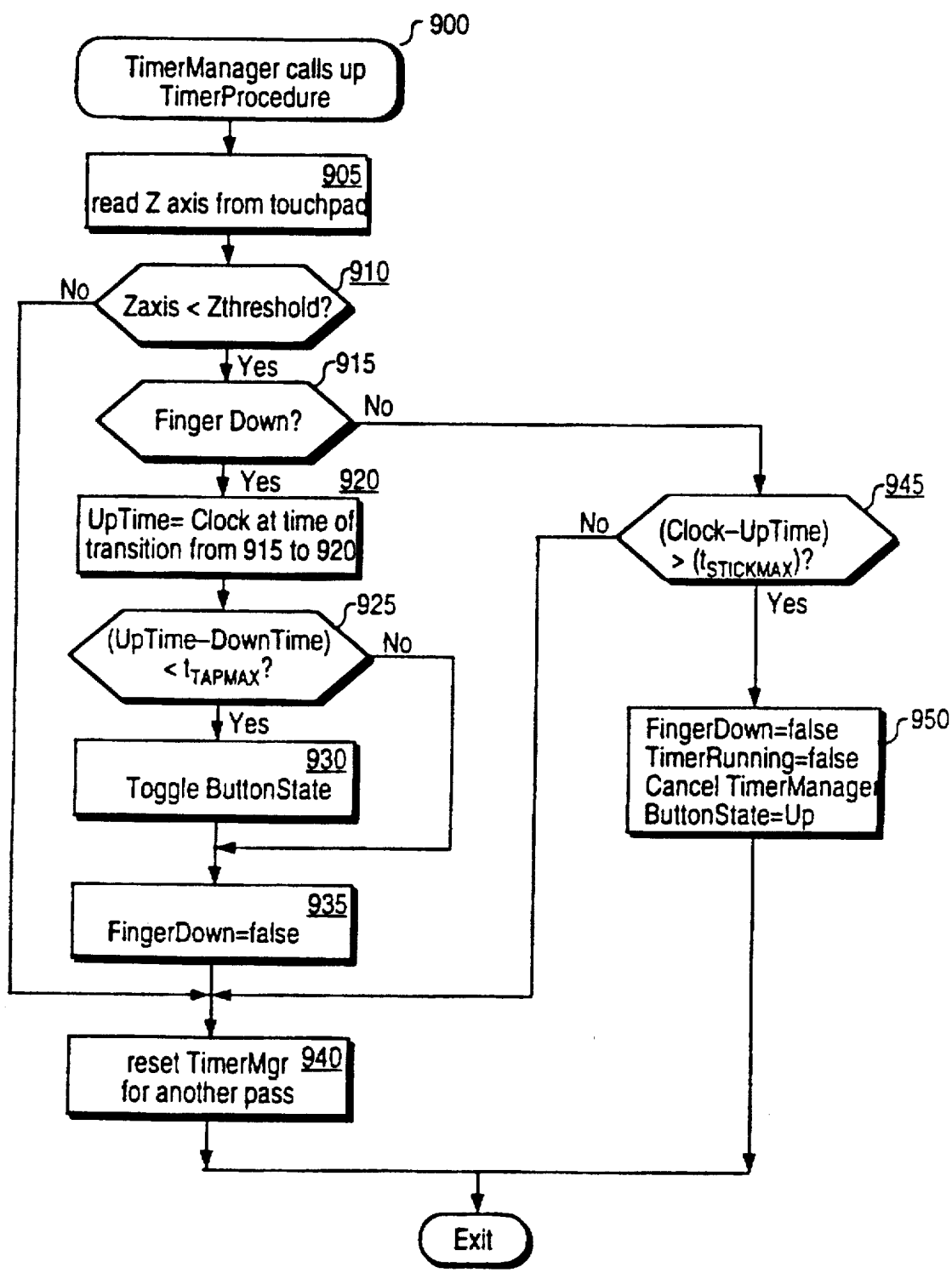
Figure 10:
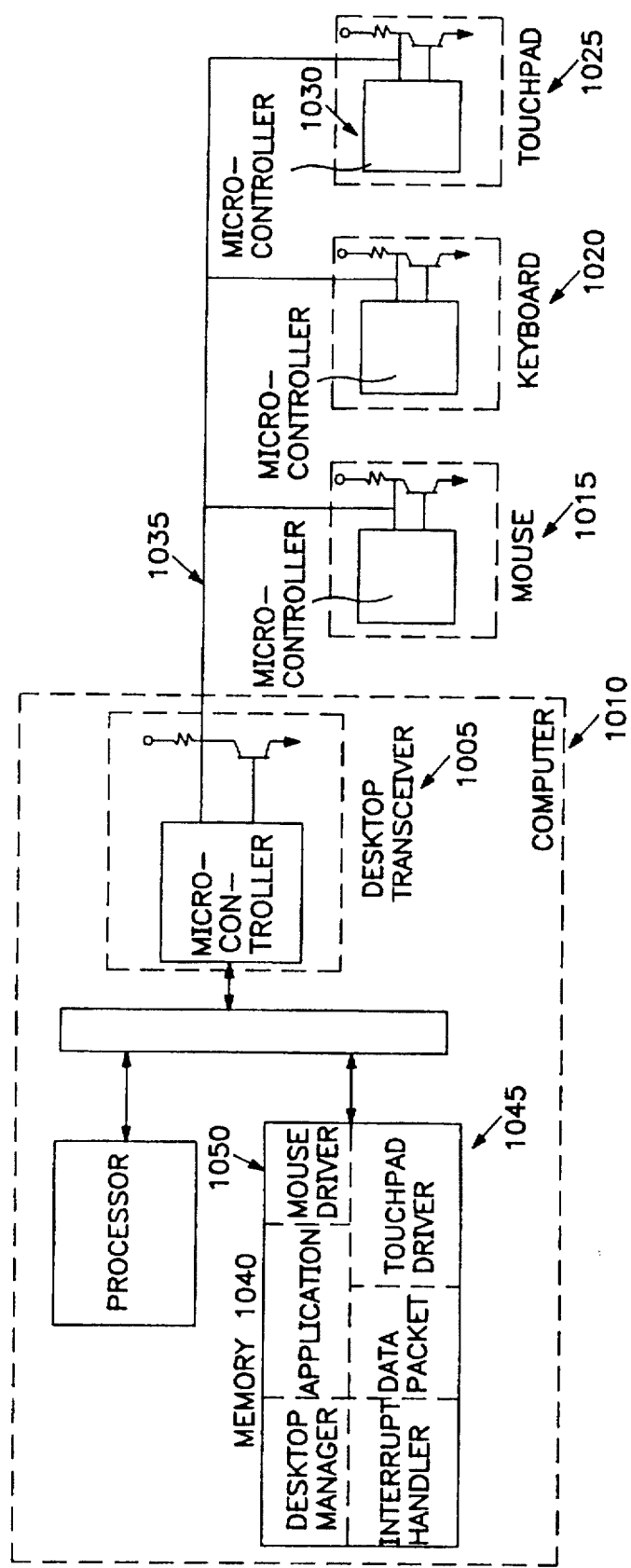
FIG. 10 presents a computer system upon which the embodiment of the present invention sets forth in FIGS. 8 and 9 is implemented.

FIGS. 8 and 9 present yet another embodiment of the present invention for generating button values with a touch-sensitive cursor-controlling input device, such as a touch-sensitive input device of FIG. 2. This embodiment of the present invention is implemented upon computer system 1010 of FIG. 10. As shown in this figure, computer system 1010 communicates with mouse 1015, keyboard 1020, and touchpad 1025 through desktop bus 1035, whose operation is controlled by the microcontrollers of desktop transceiver 1005 and of the input devices (i.e., mouse 1015, keyboard 1020, and touchpad 1025). These microcontrollers use a specific protocol (e.g., the Apple® desktop bus protocol) to communicate to each other through the desktop bus. In one embodiment of the present invention, computer system 1010 is one of the Macintosh® family of personal or laptop computers such as the Macintosh® Quadra®), Performa®, Powerbook®, PowerMac® brand personal computers manufactured by Apple® Computer, Inc. of Cupertino, Calif. (Apple, Macintosh, Quadra, Performa, Powerbook, and PowerMac are registered trademarks of Apple Computer, Inc.).

For one embodiment of the present invention, the steps of the flow charts of FIGS. 8 and 9 are performed by a touchpad driver residing in memory unit 1040 of computer system 1010. Touchpad driver 1045 generates button values, corresponding to the button position of a mechanical switch, based on the temporal duration of the user's contact with the touchpad (i.e., based on the duration of the contact intervals) and the lapse of time between subsequent contact intervals (i.e., based on the duration of the gap intervals between subsequent contact intervals). Consequently, once the touchpad driver has examined a data packet coming from touchpad 1025 in order to determine whether to change the value of a ButtonState variable, touchpad driver 1045 initializes mouse driver 1050. The mouse driver then examines positional data coming from the touchpad and the ButtonState variable, in order to perform control operations (such as cursor manipulation, click, multi-click, drag, click-and-drag, and multi-click-and-drag operations).

The operation of this touchpad driver will now be described with reference to FIGS. 8 and 9. At step 800, a determination is made whether information transmitted to desktop bus transceiver 1005 via desktop bus 1035 originated from touchpad 1025. If so, at step 810, the determination is made whether this communication from the touchpad pertains to positional data relating to a change in the user's contact with the touchpad (e.g., whether the data indicates a change in the user's finger position on the touchpad in the x and y axes). In one embodiment of the present invention, this determination of step 810 involves ascertaining whether the communication from touchpad 1025 originated from the register in microcontroller 1030 (of touchpad 1025) which stores information about the x and y displacements along the touchpad. If this data packet does not indicate a change in the positional data relating to a user's contact with the touchpad, then the touchpad driver transitions to step 890 which initiates the mouse driver. As mentioned before, after the touchpad driver performs the necessary analysis for its button generation function, the touchpad device enables the mouse driver to perform control operations by examining the positional data pertaining to the touchpad and the value of the ButtonState variable.

On the other hand, if the data packet that the touchpad transmits to the computer involves data pertaining to a change in the user's contact with the touchpad, steps 820–880 are executed. In step 820, a variable SampleTime is set equal to the value of a clock unit at the time when the process transitioned from step 810 to step 820. Since the process transitions from step 810 to step 820 when data pertaining to a change in the user's contact with the touchpad arrives from the touchpad, SampleTime corresponds to the time of arrival of the last data packet from the touchpad. In one embodiment of the present invention, the clock is TickCount, which is a Macintosh low memory global clock containing the number of "ticks" (where each tick is one sixtieth of a second) since the computer was turned on. As mentioned below, the variable SampleTime is used to determine the time that elapses between the time that the user initiates a contact with the touchpad (e.g., places his finger down on the touchpad) and the time the user terminates this contact with the touchpad (e.g., removes his finger from the touchpad.)

At step 830, a determination is made whether a Boolean variable, FingerDown, has a value of True or False. If this Boolean variable is not True, the touchpad driver next transitions to step 840, while if it is True the process transitions to step 890. At step 840, the value of the FingerDown variable is set to True, and a variable DownTime is set equal to SampleTime. Thus, when the user initiates the first contact with the touchpad (i.e., when computer system 1010 receives the first data packet from the touchpad after either step 935 or 950 of FIG. 9 has set the value of the FingerDown variable to False), the process of FIG. 8 transitions from step 830 to 840 and sets the FingerDown variable to True. At step 850, a determination is made whether the timer procedure of FIG. 9 has been initialized. If so, the touchpad driver transitions to step 880.

Otherwise, steps 860 and 870 are executed. In step 860, the timer running condition is set to be True and the value of a TimerPeriod variable is set to equal a predetermined user selectable value. In one embodiment of the present invention, the TimerPeriod variable is set equal to one half of DoubleTime, which is a Macintosh low memory global variable representing the maximum number of ticks allowed between two clicks in a double-click operation. The use of DoubleTime is convenient because it is user-adjustable and it relates to how fast an operator might depress and release the mechanical button switch.

Next, at step 870, a TimerManager program is initiated whose sole purpose is to start the timer procedure of FIG. 9 once every TimerPeriod. More specifically, this TimerManager program repeatedly calls the timer procedure once every TimerPeriod until it is canceled at step 950 of FIG. 9. Finally, at step 880, the touchpad driver program performs an OR operation on the ButtonState variable (whose value is controlled by the timer procedure of FIG. 9) with an actual mechanical button switch value. This allows the mechanical button switch to override the touchpad. At step 890, the value of the ButtonState generated at step 880 and value of the x, y, and z touchpad information is then supplied to the standard mouse driver, which then performs the requested control operation.

FIG. 9 presents one embodiment of the timer procedure that operates in conjunction with the steps of FIG. 8 to produce button values. At step 900, this timer procedure is initialized every TimerPeriod by the TimerManager program, which is installed by the process of FIG. 8. At step 905, the computer reads the z-axis information from the touchpad in order to determine if the user has terminated his contact with the touchpad. Then, at step 910, a determination is made as to whether the z-axis data read from the touchpad is less than a predetermined threshold value ($z_{threshold}$). The z-axis data is compared to a threshold value at step 910 in order to optimize the operation of the touch-sensitive input device by performing a filtering operation. If the z-axis data is not less than the $z_{threshold}$ value, the process of FIG. 9 then executes step 940, which resets the TimerManager program for calling the timer procedure at the next TimerPeriod interval.

Otherwise, if the z-axis data is greater or equal to the predetermined $z_{threshold}$ value (which indicates that the user is no longer contacting the touchpad), a determination is made as to the value of the FingerDown Boolean variable. If this variable is True, an UpTime variable is created and its value is set equal to the clock value at the moment that the timer procedure transitioned from step 915 to step 920. Since the process of FIG. 9 transitions from step 915 to step 920 only once for each contact interval (as step 935 sets the value of FingerDown to false) and only after the user terminates his contact (as the process can only transition from steps 910 to 920 if at step 910 a determination is made that the z-axis data is less than $z_{threshold}$), UpTime corresponds to the time that the user terminates his contact with the touchpad. At step 925, a determination is then made as to whether UpTime minus DownTime is less than a user selectable maximum tap time ($t_{TAPMAX}$). If this is true, then at step 930 the ButtonState variable is caused to toggle (i.e., to change from Up to Down or to change from Down to Up). Otherwise, step 930 is skipped. At step 935, the FingerDown condition is set to false. As mentioned before, at step 940, the Timer Procedure resets the timer process for another pass and the process exits.

On the other hand, if at step 915 a determination is made that the FingerDown variable is false, step 945 is performed. In step 945, a determination is made as to whether the clock minus UpTime variable is greater than a user selected maximum sticky time. If the result is negative, then step 940 is executed. Otherwise, at step 950, the FingerDown and TimerRunning conditions are set to be false, the TimerManager is canceled, and the ButtonState variable is set equal to the Up value at step 950.

As mentioned before, the embodiment of the present invention set forth in FIGS. 8 and 9 provides a method for contacting a touchpad to change the value of a button variable, which simulates the button state (e.g., the up or down position) of a mechanical button switch. More specifically, this embodiment of the present invention enables an operator to generate button values based on the duration of the contact intervals and the frequency of the contact intervals. In turn, as shown in FIG. 11, this button generation capability enables an operator to perform with a single touch-sensitive cursor-controlling input device numerous control operations, such as cursor manipulation, click, multi-click, drag, click-and-drag, and multi-click-and-drag operations.

For example, as shown in Part A of FIG. 11, an operator can perform a cursor manipulation operation by contacting the touch-sensitive input device and maintaining this contact for more than a user-selectable maximum tap interval (i.e., $t_{T1} > t_{TAPMAX}$). In other words, when the contact interval is longer than the maximum tap interval, this embodiment of the present invention does not produce a button down signal and only initializes the mouse driver in order to cause this driver to examine the positional data coming from the touchpad to perform the requested cursor tracking operation. However, as shown in Part B of FIG. 11, an operator can perform a click operation by (1) maintaining his first contact with the touch-sensitive input device for less than the maximum tap interval, and (2) not initiating a second contact interval with the touch-sensitive input device until the maximum sticky time has elapsed. In addition, as shown in Part C of FIG. 11, an operator can perform a click operation by twice quickly tapping the touch-sensitive input device, where each tap toggles the ButtonState variable once.

Moreover, an shown in Parts D—G of FIG. 11, this embodiment of the present invention enables an operator to perform a double-click operation by performing two click operations in a row. It should be noted that in this embodiment of the present invention, the mouse driver measures the gap time between subsequent click operations, in order to ascertain whether the subsequent click operations are part of a multi-click operation. Furthermore, as shown in Parts H–J in FIG. 11, a user can perform a drag operation (i.e., generate a button down value and maintain this button down value for the duration of the contact interval during which the user tracks across the touchpad) if (1) a first contact interval is not longer than the maximum tap interval, (2) the gap interval between the first contact interval and the second contact interval is not greater than the user-selectable maximum sticky time, and (3) the second tap interval lasts longer than the maximum tap interval. As shown in Part I of FIG. 11, this embodiment of the present invention also allows a user to reposition his finger during a drag operation. Finally, as shown in Part J of FIG. 11, this embodiment of the present invention enables an operator to cancel the sticky drag feature by quickly tapping the touch-sensitive input device at the end of a drag operation, in order to toggle the ButtonState variable.

It will be recognized that the above-described invention may be embodied in other specific forms without departing from the spirit or the essential characteristics of the invention. For example, although the above-mentioned embodiments generate a ButtonDown value at the termination of the user's contact with the touch-sensitive input device, it will be understood by one skilled in the art that alternative embodiments of the present invention generate a button down signal at different times. For example, a button down signal can be generated (1) when the user initiates a contact, (2) a predetermined amount of time after the user initiates a contact with the touch-sensitive input device, or (3) a predetermined amount of time after the user terminates his contact with the touch-sensitive input device. However, it should be noted that selection upon lifting has the advantage of allowing the user to move off of a mistakenly selected object without activating it. In addition, alternative embodiments of the present invention determine the z-axis velocity and acceleration of the contact in order to further discern between operations. Z-axis sensitivity may also be used to discern operations by indicating how far the finger was lifted off the touchpad during the operation. Thus, while certain exemplary embodiments have been described and shown in the accompanying drawings, it is to be understood that the invention is not limited by the foregoing illustrative details, but rather is defined by the appended claims.

What is claimed is:

1. A method of operating a touch-sensitive input device of a computer system comprising the steps of:
 a) detecting contact intervals when a user contacts the touch-sensitive input device;
 b) detecting gap intervals between subsequent contact intervals; and
 c) distinguishing between a first cursor control operation, a second cursor control operation and a third cursor control operation based on the duration of said contact and gap intervals; and
 d) reporting one of said first, second or third cursor control operations in accordance with said step of distinguishing.

2. A method of using a touch-sensitive input device coupled to a computer system to move a cursor on a display screen of the computer system and to change the value of a ButtonState variable to one of a first button value and a second button value, said ButtonState variable simulating a button state of a mechanical button switch, said method comprising the steps of:
 a) detecting a first contact interval when a user first contacts said touch-sensitive input device;
 b) determining if said first contact interval lasts longer than a first predetermined maximum time interval;
 c) supplying positional data relating to the first contact interval to said computer system to cause the cursor to move across said display screen if said first contact interval lasts longer than said first predetermined maximum time interval;
 d) setting the value of the ButtonState variable to the first button value if said first contact interval does not last longer than said first predetermined maximum time interval;
 e) detecting whether a second contact interval follows said first contact interval in less than a second predetermined maximum time interval;
 f) setting the value of the ButtonState variable to the second button value if said second contact interval does not follow said first contact interval in less than said second predetermined maximum time interval;
 g) determining if said second contact interval lasts longer than a third redetermined maximum time interval if said second contact interval does follow said first contact interval in less than said second predetermined maximum time interval;
 h) supplying positional data relating to the second contact interval to said computer system to cause the cursor to move across said display screen if said second contact interval lasts longer than said third predetermined maximum time interval;
 i) detecting whether a third contact interval follows said second contact interval in less than a fourth predetermined maximum time interval;
 j) setting the value of the ButtonState variable to the second button value if said third contact interval does not follow said second contact interval in less than said fourth predetermined maximum time interval;
 k) determining if said third contact interval lasts longer than a fifth predetermined maximum time interval if said third contact interval does follow the second contact interval in less than said fourth predetermined maximum time interval; and
 l) supplying positional data relating to the third contact interval to said computer system in order to maintain the cursor movements initiated by supplying positional data relating to the second contact interval to the computer system if said third contact interval lasts longer than said fifth predetermined maximum time interval.

3. The method of claim 2 further comprising the step of setting the value of the ButtonState variable to the second button value if said third contact interval does not last longer than said fifth predetermined maximum time interval.

4. A method of using a touch-sensitive input device coupled to a computer system to move a cursor on a display screen of the computer system and to change the value of a ButtonState variable to one of a first button value and a second button value, said ButtonState variable simulating a button state of a mechanical button switch, said method comprising the steps of:
 a) detecting a first contact interval when a user first contacts said touch-sensitive input device;
 b) determining if said first contact interval lasts longer than a first predetermined maximum time interval;
 c) supplying positional data relating to the first contact interval to said computer system to cause the cursor to move across said display screen if said first contact interval lasts longer than said first predetermined maximum time interval;
 d) setting the value of the ButtonState variable to the first button value if said first contact interval does not last loner than said first predetermined maximum time interval;
 e) detecting whether a second contact interval follows said first contact interval in less than a second predetermined maximum time interval;
 f) setting the value of the ButtonState variable to the second button value if said second contact interval does not follow said first contact interval in less than said second predetermined maximum time interval;
 g) determining if said second contact interval lasts longer than a third predetermined maximum time interval if said second contact interval does follow said first contact interval in less than said second predetermined maximum time interval;

h) supplying positional data relating to the second contact interval to said computer system to cause the cursor to move across said display screen if said second contact interval lasts longer than said third predetermined maximum time interval;

i) setting the value of the ButtonState variable to the second button value if said second contact interval does not last longer than said third predetermined j) setting the value of the ButtonState variable to the first button value;

k) detecting whether a third contact interval follows said second contact interval in less than a fourth predetermined maximum time interval;

l) setting the value of the ButtonState variable to the second button value if said third contact interval does not follow said second contact interval in less than said fourth predetermined maximum time interval;

m) determining if said third contact interval lasts longer than a fifth predetermined maximum time interval if said third contact interval does follow said second contact interval in less than said fourth predetermined maximum time interval; and n) supplying positional data relating to the third contact interval to said computer system to cause the cursor to move across said display screen if said third contact interval lasts longer than said fifth predetermined maximum time interval.

5. An apparatus for operating a touch-sensitive input device of a computer system comprising:

a) means for detecting contact intervals when a user contacts the touch-sensitive input device;

b) means for detecting gap intervals between subsequent contact intervals; and c) means for distinguishing between a first cursor control operation, a second cursor control operation and a third cursor control operation based on the duration of said contact and gap intervals and for reporting one of said first second or third cursor control operations in accordance therewith.

6. An apparatus for using a touch-sensitive input device coupled to a computer system to move a cursor on a display screen of the computer system and to change the value of a ButtonState variable to one of a first button value and a second button value, said ButtonState variable simulating a button state of a mechanical button switch, said apparatus comprising:

a) circuitry for detecting a first contact interval when a user first contacts said touch-sensitive input device;

b) circuitry for determining if said first contact interval lasts longer than a first predetermined maximum time interval;

c) circuitry for supplying positional data relating to the first contact interval to said computer system to cause the cursor to move across said display screen if said first contact interval lasts longer than said first predetermined maximum time interval;

d) circuitry for setting the value of the ButtonState variable to the first button value if said first contact interval does not last longer than said first predetermined maximum time interval;

e) circuitry for detecting whether a second contact interval follows said first contact interval in less than a second predetermined maximum time interval;

f) circuitry for setting the value of the ButtonState variable to the second button value if said second contact interval does not follow said first contact interval in less than said second predetermined maximum time interval;

g) circuitry for determining if said second contact interval lasts longer than a third predetermined maximum time interval, if said second contact interval does follow said first contact interval in less than said second predetermined maximum time interval;

h) circuitry for supplying positional data relating to the second contact interval to said computer system to cause the cursor to move across said display screen, if said second contact interval lasts longer than said third predetermined maximum time interval;

i) circuitry for detecting whether a third contact interval follows said second contact interval in less than a fourth predetermined maximum time interval;

j) circuitry for setting the value of the ButtonState variable to the second button value if said third contact interval does not follow said second contact interval in less than said fourth predetermined maximum time interval;

k) circuitry for determining if said third contact interval lasts longer than a fifth predetermined maximum time interval, if said third contact interval does follow the second contact interval in less than said fourth predetermined maximum time interval;

l) circuitry for supplying positional data relating to the third contact interval to said computer system in order to maintain the cursor movements initiated by supplying positional data relating to the second contact interval to the computer system, if said third contact interval last longer than said fifth predetermined maximum time interval.

7. The apparatus of claim 6 further comprising circuitry for setting the value of the ButtonState variable to the second button value if said third contact interval does not last longer than said fifth predetermined maximum time interval.

8. An apparatus for using a touch-sensitive input device coupled to a computer system to move a cursor on a display screen of the computer system and to change the value of a ButtonState variable to one of a first button value and a second button value, said ButtonState variable simulating a button state of a mechanical button switch, said apparatus comprising:

a) circuitry for detecting a first contact interval when a user first contacts said touch-sensitive input device;

b) circuitry for determining if said first contact interval lasts loner than a first predetermined maximum time interval;

c) circuitry for supplying positional data relating to the first contact interval to said computer system to cause the cursor to move across said display screen if said first contact interval lasts longer than said first predetermined maximum time interval;

d) circuitry for setting the value of the ButtonState variable to the first button value if said first contact interval does not last longer than said first predetermined maximum interval;

e) circuitry for detecting whether a second contact interval follows said first contact interval in less than a second predetermined maximum time interval;

f) circuitry for setting the value of the ButtonState variable to the second button value if said second contact interval does not follow said first contact interval in less than said second predetermined maximum time interval;

g) circuitry for determining if said second contact interval lasts longer than a third predetermined maximum time interval, if said second contact interval does follow said first contact interval in less than said second predetermined maximum time interval;

h) circuitry for supplying positional data relating to the second contact interval to said computer system to cause the cursor to move across said display screen, if said second contact interval lasts longer than said third predetermined maximum time interval;

i) circuitry for setting the value of the ButtonState variable to the second button value if said second contact interval does not last loner than said third predetermined maximum time interval;

j) circuitry for setting the value of the ButtonState variable to the first button value;

k) circuitry for detecting whether a third contact interval follows said second contact interval in less than a fourth predetermined maximum time interval;

l) circuitry for setting the value of the ButtonState variable to the second button value if said third contact interval does not follow said second contact interval in less than said fourth predetermined maximum time interval;

m) circuitry for determining if said third contact interval lasts longer than a fifth predetermined maximum time interval, if said third contact interval does follow said second contact interval in less than said fourth predetermined maximum time interval; and n) circuitry for supplying positional data relating to the third contact interval to said computer system to cause the cursor to move across said display screen if said third contact interval lasts longer than said fifth predetermined maximum time interval.

9. A computer system comprising:

a) a bus b) a touch-sensitive input device coupled to said bus;

c) an apparatus for using said touch-sensitive input device to move a cursor on a display screen of the computer system and to change the value of a ButtonState variable to one of a first button value and a second button value, said ButtonState variable simulating a button state of a mechanical button switch, said apparatus including:

1) circuitry for detecting a first contact interval when a user first contacts said touch-sensitive input device;

2) circuitry for determining if said first contact interval lasts loner than a first predetermined maximum time interval;

3) circuitry for supplying positional data relating to the first contact interval to said computer system to cause the cursor to move across said display screen if said first contact interval lasts longer than said first predetermined maximum time interval;

4) circuitry for setting the value of the ButtonState variable to the first button value if said first contact interval does not last longer than said first predetermined maximum time interval 5) circuitry for detecting whether a second contact interval follows said fist contact interval in less than a second predetermined maximum time interval;

6) circuitry for setting the value of the ButtonState variable to the second button value if said second contact interval does not follow said first contact interval in less than said second predetermined maximum time interval;

7) circuitry for determining if said second contact interval lasts longer than a third predetermined maximum time interval, if said second contact interval does follow said first contact interval in less than said second predetermined maximum time interval;

8) circuitry for supplying positional data relating to the second contact interval to said computer system to cause the cursor to move across said display screen, if said second contact interval lasts longer than said third predetermined maximum time interval;

9) circuitry for detecting whether a third contact interval follows said second contact interval in less than a fourth predetermined maximum time interval;

10) circuitry for setting the value of the ButtonState variable to the second button value if said third contact interval does not follow said second contact interval in less than said fourth predetermined maximum time interval;

11) circuitry for determining if said third contact interval lasts longer than a fifth predetermined maximum time interval, if said third contact interval does follow the second contact interval in less than said fourth predetermined maximum time interval; and 12) circuitry for supplying positional data relating to the third contact interval to said computer system in order to maintain the cursor movements initiated by supplying positional data relating to the second contact interval to the computer system, if said third contact interval lasts longer than said fifth predetermined maximum time interval.

10. The computer system of claim 9, wherein said apparatus further comprises circuitry for setting the value of the ButtonState variable to the second button value if said third contact interval does not last longer than said fifth predetermined maximum time interval.

11. The computer system of claim 10, wherein said apparatus further comprises:

a) circuitry for setting the value of the ButtonState variable to the second button value if said second contact interval does not last longer than said third predetermined maximum time interval;

b) circuitry for setting the value of the ButtonState variable to the first button value;

c) circuitry for detecting whether a third contact interval follows said second contact interval in less than a fourth predetermined maximum time interval; and d) circuitry for setting the value of the ButtonState variable to the second button value if said third contact interval does not follow said second contact interval in less than said fourth predetermined maximum time interval.

12. The computer system of claim 11, wherein said apparatus further comprises:

a) circuitry for determining if said third contact interval lasts longer than a fifth predetermined maximum time interval, if said third contact interval does follow said second contact interval in less than said fourth predetermined maximum time interval; and b) circuitry for supplying positional data relating to the third contact interval to said computer system to cause the cursor to move across said display screen if said third contact interval lasts longer than said fifth predetermined maximum time interval.

* * * * *

UNITED STATES PATENT AND TRADEMARK OFFICE
CERTIFICATE OF CORRECTION

PATENT NO. : 5,764,218

DATED : June 9, 1998

INVENTOR(S) : Della Bona et al.

It is certified that error appears in the above-identified patent and that said Letters Patent is hereby corrected as shown below:

In column 9 at line 1 delete "multi-lick" and insert --multi-click--

In column 14 at line 4 delete "redetermined" and insert --predetermined--

In column 14 at line 56 delete "loner" and insert --longer--

In column 15 at line 10 following "predetermined"
insert --maximum time interval;--

In column 16 at line 52 delete "loner" and insert --longer--

In column 16 at line 62 prior to "interval" and following "maximum"
insert --time--

In column 17 at line 16 delete "loner" and insert --longer--

UNITED STATES PATENT AND TRADEMARK OFFICE
CERTIFICATE OF CORRECTION

PATENT NO. : 5,764,218
DATED : June 9, 1998
INVENTOR(S) : Della Bona et al.

It is certified that error appears in the above-identified patent and that said Letters Patent is hereby corrected as shown below:

In column 17 at line 51 delete "loner" and insert --longer--

Signed and Sealed this

Twenty-ninth Day of December, 1998

Attest:

BRUCE LEHMAN

Attesting Officer

Commissioner of Patents and Trademarks